United States Patent [19]

Brew et al.

[11] Patent Number: 5,070,600
[45] Date of Patent: Dec. 10, 1991

[54] TOOL POSITIONING ASSEMBLY

[75] Inventors: John D. Brew, Forest; Michael C. Gould, Lynchburg; Orville L. Lindsey, Lynchburg; Rex A. Pendergraft, Lynchburg, all of Va.

[73] Assignee: The Babcock & Wilcox Company, New Orleans, La.

[21] Appl. No.: 543,995

[22] Filed: Jun. 29, 1990

[51] Int. Cl.$^5$ ............................................. B23P 15/26
[52] U.S. Cl. .................................. 29/723; 29/402.01; 29/726; 29/823
[58] Field of Search .................. 29/723, 726, 822, 823, 29/402.01; 376/260

[56] References Cited

U.S. PATENT DOCUMENTS

| | | | |
|---|---|---|---|
| Re. 33,373 | 10/1990 | Gallo et al. | 376/260 |
| 4,639,994 | 2/1987 | Cooper, Jr. et al. | 29/723 |
| 4,673,545 | 6/1987 | Cooke et al. | 29/723 |
| 4,715,111 | 12/1987 | Kapoor et al. | 29/723 |
| 4,716,010 | 12/1987 | Gallo et al. | 376/260 |

FOREIGN PATENT DOCUMENTS 2119309 11/1983 United Kingdom .................. 29/723

*Primary Examiner*—Irene Cuda
*Attorney, Agent, or Firm*—Robert J. Edwards; D. Neil LaHaye

[57] ABSTRACT

A tool positioning assembly for receiving tooling for repairing heater penetrations at the lower end of a pressurizer supported on its end by a support skirt between the pressurizer and a base with the pressurizer having a surge line extending vertically into the apex of the lower spherical end of the pressurizer. A pair of circular tracks are mounted so as to be concentric with the pressurizer. The inner track is mounted to the surge line and the outer track is mounted so as to be below the outer periphery of the pressurizer. A carriage is movably mounted between the tracks so as to be movable therebetween and around the pressurizer. Cross slides mounted on the carriage provide horizontal movement. A vertical slide mounted on the upper cross slide provides vertical movement and is also rotatable around its own vertical axis for clearance purposes when maneuvering around the heater penetration nozzles.

13 Claims, 7 Drawing Sheets

TOOL POSITIONING ASSEMBLY

BACKGROUND OF THE INVENTION

1. Field of the Invention

The present invention is generally related to the repair of nuclear pressurizers and more particularly to an assembly for positioning tools used in the repair of heating element penetrations in the lower head of nuclear pressurizers.

2. General Background

The pressurizer in a nuclear reactor coolant system establishes and maintains the reactor coolant system pressure within the prescribed limits of the system. It provides a steam surge chamber and a water reserve to accommodate reactor coolant density changes during operation. A typical pressurizer is a vertical, cylindrical vessel with replaceable electric heaters in its lower section. The electric heaters are positioned below the normal water line and are actuated to restore normal operating pressure when the pressure in the reactor coolant system has decreased. The electric heaters are comprised of a plurality of heating elements that extend through nozzles or sleeves in the wall of the pressurizer. The nozzles extend outward through the curved bottom of the pressurizer to provide support to the heating elements. Due to the operating environment, it is a common requirement that repair work be performed on the heating elements and the nozzles through which they extend.

In its normal operational position, a pressurizer is stood on end and supported by a support skirt attached to the sides of the pressurizer and a base such as a concrete platform. The base must have a hollow cylindrical interior to accommodate the surge line that extends into the bottom of the pressurizer. The outside surface of the pressurizer thus presents a convex surface with a plurality of nozzles and heating elements that extend downward and a centrally located surge line. The variable height surface, obstacles, and open area thus present difficulties in properly positioning and supporting tools used in effecting repairs on the pressurizer.

Known approaches to the positioning of tools for repair purposes have typically been directed to the repair of a predetermined position on the heater penetration matrix. One system uses a set of clamps and brackets attached to adjacent penetration hardware to hold a tooling fixture plate below the pressurizer penetration to be worked on. All positioning is performed manually and the brackets and clamps are normally designed for a single fixed position in the pressurizer head penetration matrix. Since the vertical and horizontal (X/Y) position of each penetration is unique, this approach is limited to use on isolated repairs, with the need for special brackets for different heater penetrations. A second approach uses a support system from below as opposed to being attached to the penetration hardware for support. In this approach, a set of horizontal beams are attached to the pressurizer support skirt at a fixed elevation. Tooling mounts slidably attached to the beams are manually positioned and then clamped in place. This approach is limited to the penetrations that lie along the path above the support beams, that are within the reach of the slidable tool mounts, and that are within the reach of the vertical travel of the tooling. Due to the spherical head arrangement of the penetration locations, the vertical distance from the tooling support to the spherical head surface varies drastically and typically requires vertical repositioning of the support beams upward for work on heater penetrations at the outer periphery of the heater matrix or would require vertical shimming of the tooling in order to narrow the range of vertical travel variation required by the tooling. This approach can theoretically reach an array of penetrations within a rectangular area of approximately 10 inches defined by the beam length in one direction and the stroke of the slidable plates in the other direction. However, this approach can not reach penetrations that are diametrically opposite each other due to the presence of the vertical surge line at the apex of the lower head of the pressurizer. It can be seen that a need exists for a tool positioning assembly with the capability to reach heater penetrations at all locations on the pressurizer head without the need to change the support equipment during positioning operations to accommodate the variety of vertical and horizontal positions encountered.

SUMMARY OF THE INVENTION

The present invention addresses the above need in a straightforward manner. What is provided is a tool positioning assembly for repair of heater penetrations in a nuclear pressurizer that is movable radially, vertically, horizontally, and around the radius of the pressurizer. A track system formed from two concentric circular tracks at different heights supports guide rails mounted on the two tracks. A carriage slidably mounted on the guide rails has two cross slides mounted thereon for horizontal positioning. A rotational slide mounted on the cross slides provides for rotation of equipment for clearance purposes as it is maneuvered through the maze of heater penetrations. A vertical positioning slide is mounted on the rotational slide or the uppermost cross slide for final vertical positioning of the tooling at the heater penetration to be repaired. A tool mounting plate on the vertical positioning slide receives tooling known in the art and used for such repair work. The guide rails may be moved on the tracks around the pressurizer to provide access to all of the heater penetrations.

BRIEF DESCRIPTION OF THE DRAWINGS

For a further understanding of the nature and objects of the present invention, reference should be had to the following description, taken in conjunction with the accompanying drawings in which like parts are given like reference numerals and, wherein.

DETAILED DESCRIPTION OF THE PREFERRED EMBODIMENT

Figure 1:
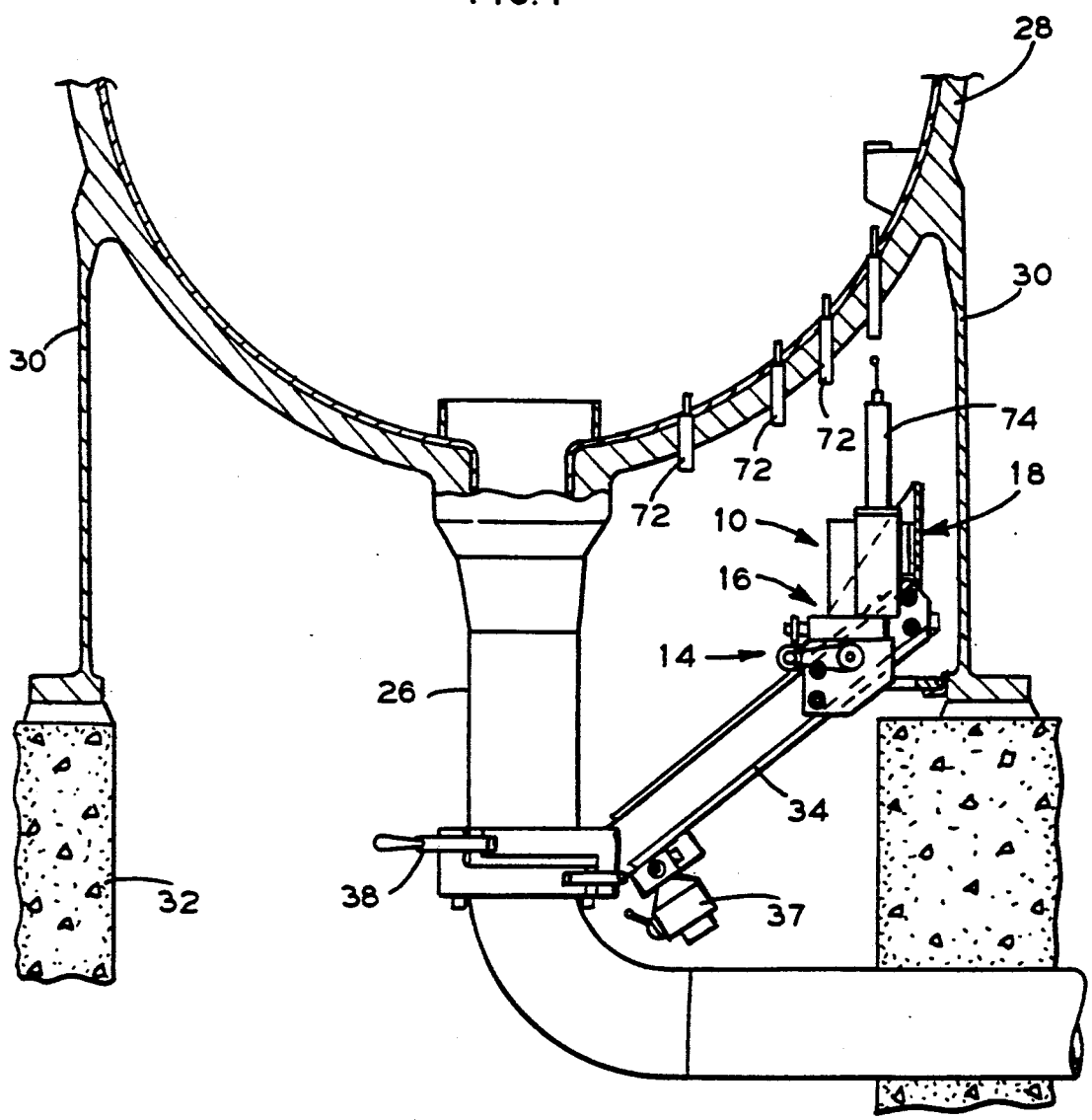
FIG. 1 is a side sectional view illustrating the invention in its installed position below a pressurizer.

Referring to the drawings, it is seen that the invention is generally referred to by the numeral 10. Tool positioning assembly 10 is generally comprised of track assembly 12, carriage 14, means 16 for positioning the assembly in the horizontal or X/Y position, means 18 for vertically positioning tooling attached to the invention, and means 20 for rotating tooling attached to the invention.

Figure 2:
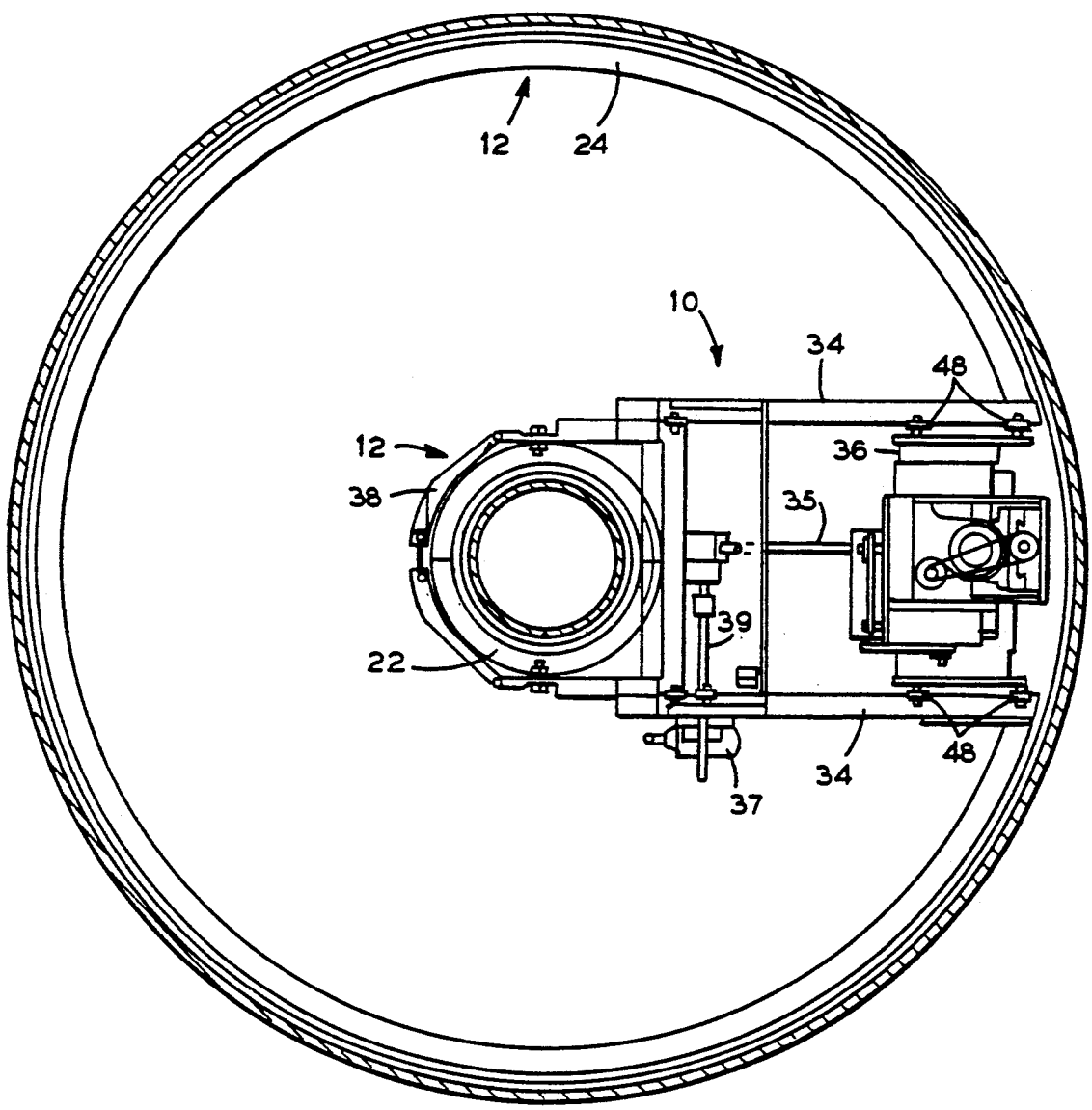
FIG. 2 a top view of the invention in its installed position.
Figure 3:
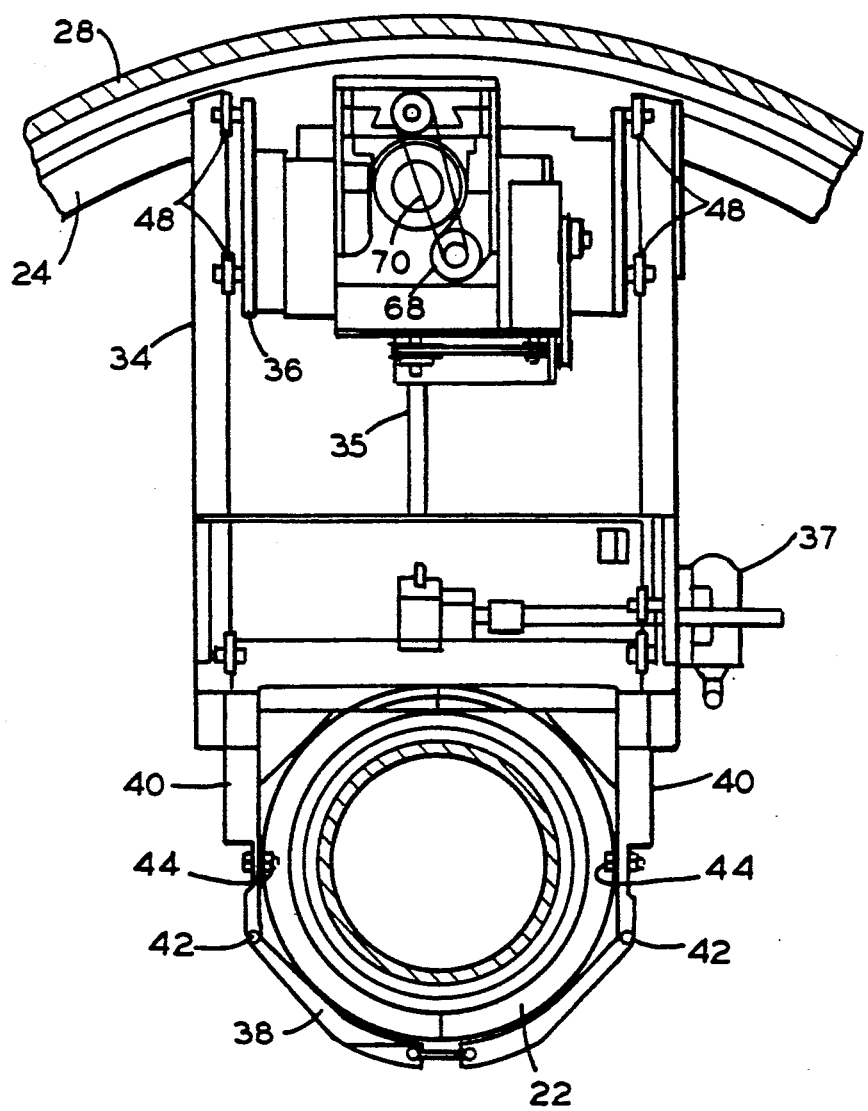
FIG. 3 a close up top view of the invention in its installed position.

Track assembly 12, best seen in FIG. 2 and 3 is formed from two circular tracks 22, 24. Inner track 22 is attached to the vertical portion of surge line 26. Surge line 26 is in fluid communication with pressurizer 28 by penetration into pressurizer 28 at the apex of the spherical lower end of pressurizer 28. Pressurizer 28 is supported in a vertical position by support skirt 30 that is attached to and extends downward from pressurizer 28 to base 32. Base 32 is formed from any suitable material to support the weight of pressurizer 28 such as concrete. Inner track 22 may be attached to surge line 26 by any suitable means such as by clamping and using leveling screws to insure that the track is level around surge line 26. Outer track 24 may be attached to support skirt 30 by welding or it may be attached to base 32. FIG. 1 illustrates both situations where support skirt 30 is at the edge of base 32 and where support skirt 30 is set away from the edge of base 32 so that there is room for outer track 24. Each track is concentric with the central axis of pressurizer 28. For ease of illustration, only a small number of heater penetration nozzles 72 are shown, however, it should be understood that nozzles 72 are present around the entire spherical head of pressurizer 28.

Figure 4:
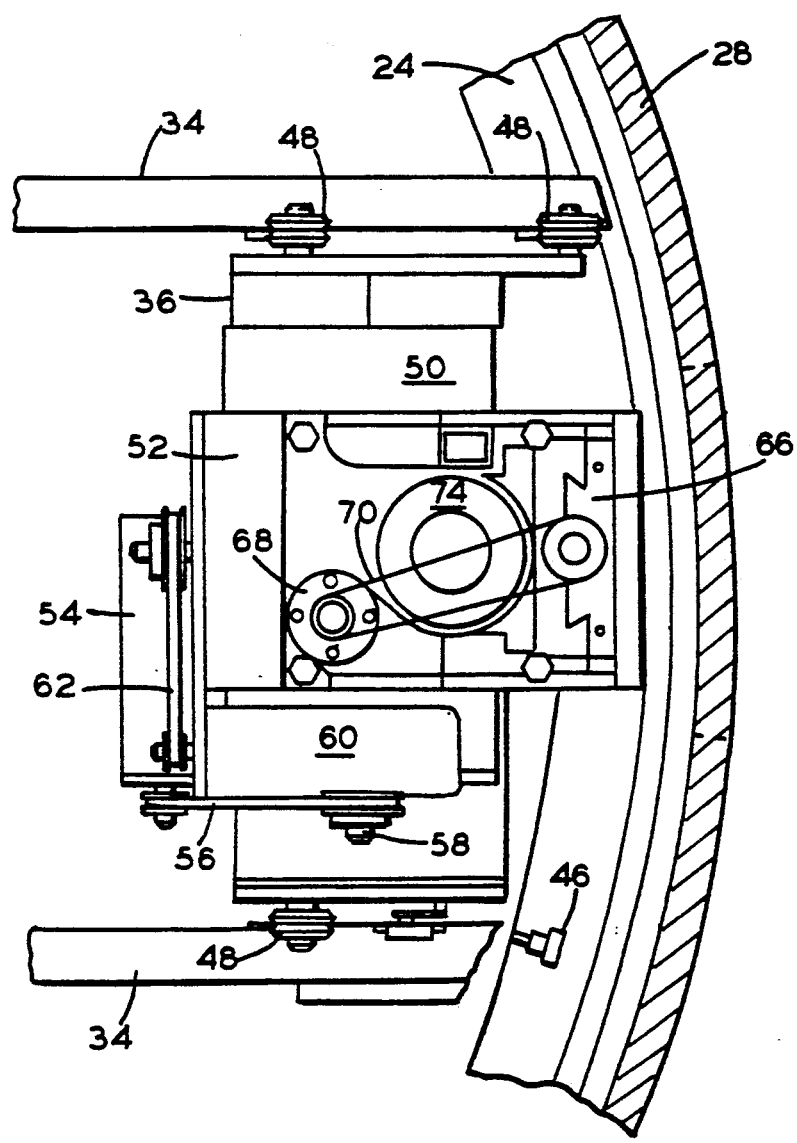
FIG. 4 a top detailed view of the carriage and the associated positioning equipment of the invention.
Figure 5:
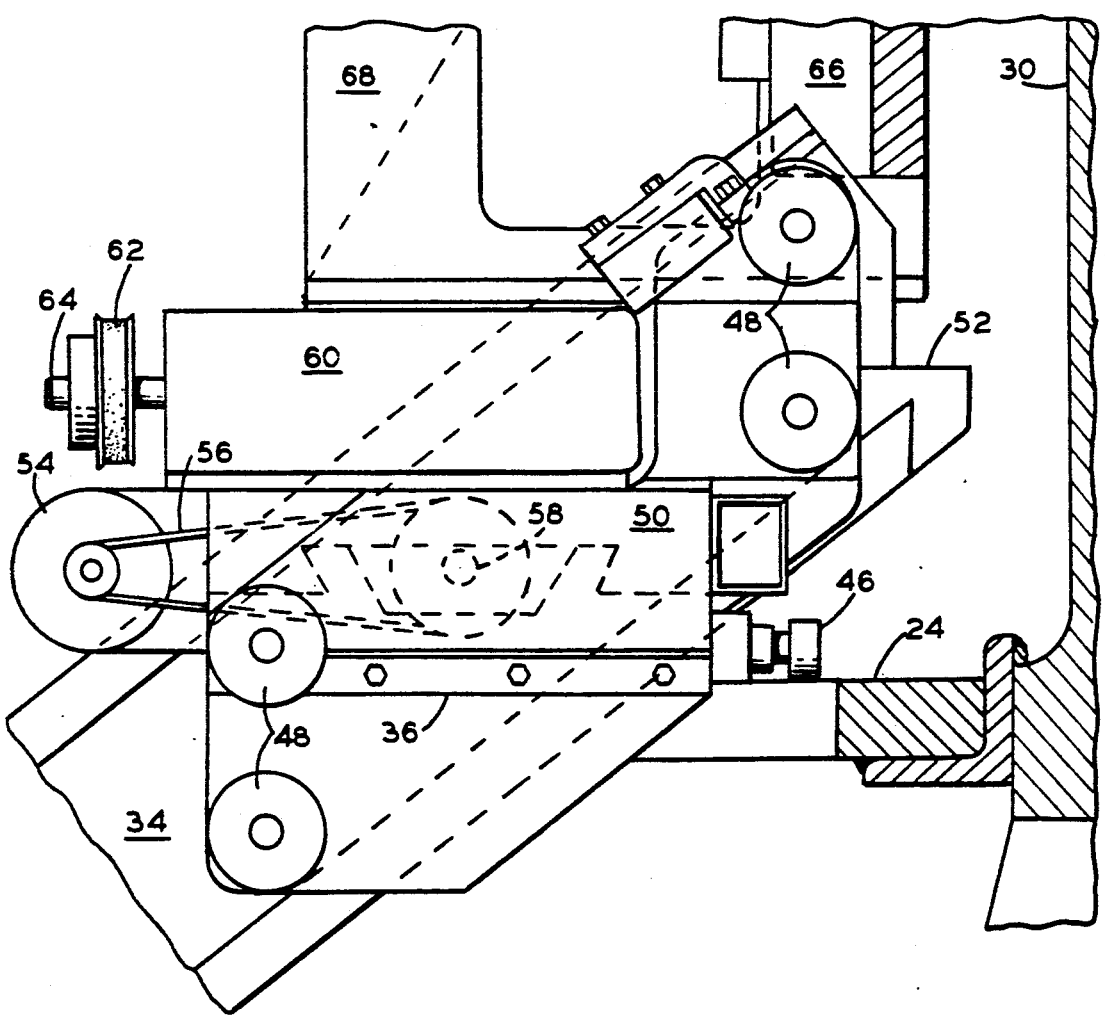
FIG. 5 a side detailed view of the carriage and the associated positioning equipment of the invention.

Carriage 14 is formed from guide rails 34 and plate 36 movably mounted between guide rails 34 for radial movement relative to pressurizer 28 between tracks 22, 24. As best seen in FIG. 1-3, guide rails 34 are movably attached at one end to inner track 22 by clamp 38. Arms 40 extend from guide rails 34 and have clamp 38 attached at each end thereof as indicated by the numeral 42. Rollers 44 rotatably mounted on arms 40 extend radially inward therefrom to rest on inner track 22 to provide support and allow rotation around track 22. The opposite end of guide rails 34 are movably received on outer track 24 by providing rollers 46, one of which is shown in FIG. 4 in a partial cutaway view since these rollers would normally be obscured in a top view. Rollers 46 provide support to guide rails 34 and plate 36 and allow rotation of carriage 14 around the entire circumference of tracks 22, 24. As seen in FIG. 1, tracks 22, 24 are mounted at different heights with inner track 22 being at a lower height than outer track 24. This provides an inclined orientation the purpose of which will be explained below. Plate 36 is slidably received between guide rails 34 for movement between tracks 22, 24. In the preferred embodiment, rollers 48 are used to allow movement of plate 36 along guide rails 34, however any suitable means for movement such as way slides may also be used. As best seen in FIG. 5, plate 36 is mounted between guide rails 34 so as to have its upper surface horizontally positioned. As best seen in FIG. 1-3 and 7, plate 36 is caused to move along guide rails 34 in the inclined direction R by lead screw 35 in response to operation of drive motor 37. Drive motor 37 is operatively engaged with lead screw 35 by drive shaft 39 and may be actuated remotely or by hand.

Means 16 for positioning tooling attached to assembly 10 in the X/Y or horizontal position is provided in the form of cross slides 50, 52. As indicated in FIG. 1 and 4, movement along the X axis is across the width of plate 36 and guide rails 34 while movement along the Y axis corresponds to radial movement relative to surge line 26 and pressurizer 28. As seen in FIG. 4 and 5, first cross slide 50 is the lower slide and is used for movement along the X axis while second cross slide 52 is above slide 50 and is used for movement along the Y axis. Drive motor 54 is operatively attached to first cross slide 50 by pulley 56 which is engaged with lead screw 58. In this manner, operation of drive motor 54 causes movement of pulley 56 and lead screw 58. In a manner known in the art, lead screw 58 is operatively engaged with first cross slide 50 such that rotation of lead screw 58 by drive motor 54 causes movement of first cross slide 50 along the length of lead screw 58. Second cross slide 52 is operatively engaged with drive motor 60 by pulley 62 and lead screw 64. In this manner, second cross slide 52 is caused to move along the Y axis in response to operation of drive motor 60 in a similar manner to the movement of first cross slide 50.

Figure 6:
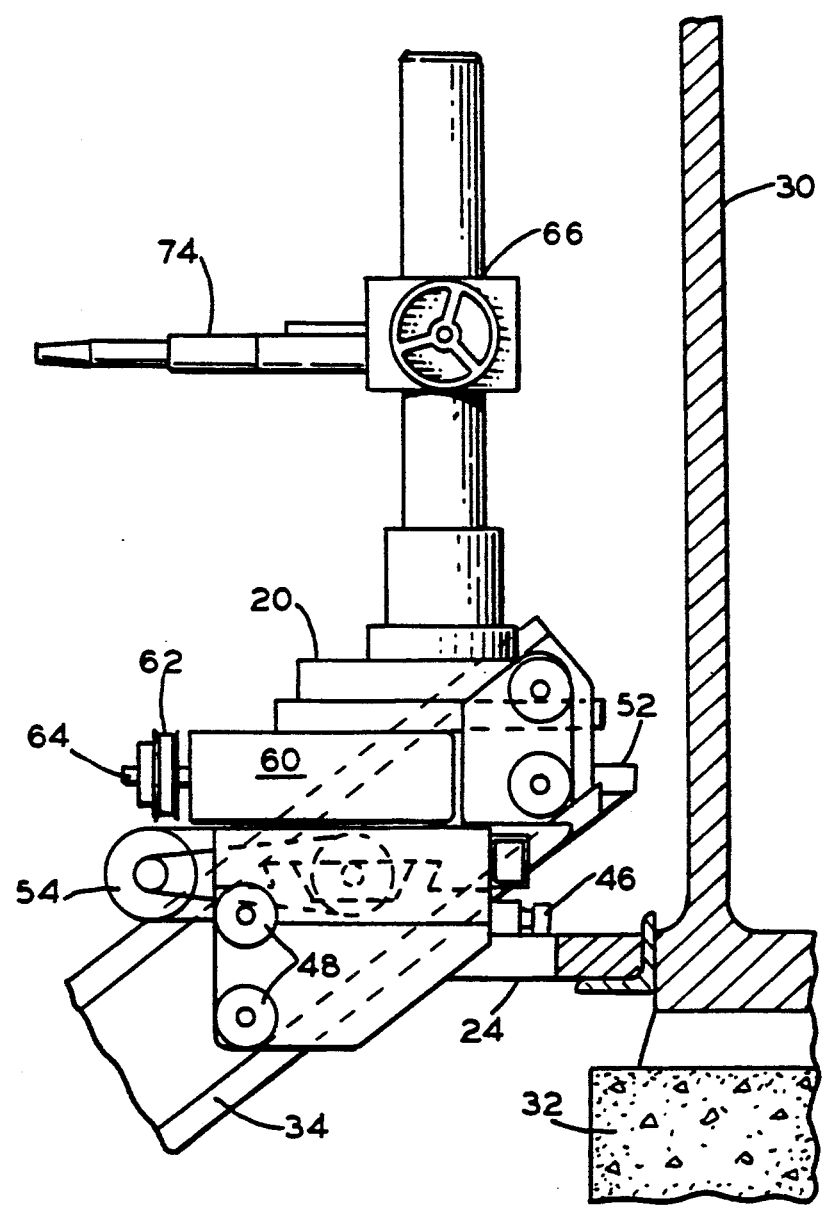
FIG. 6 is a side view similar to FIG. 5 illustrating an alternate embodiment of the vertical slide with different tooling attached thereto.
Figure 7:
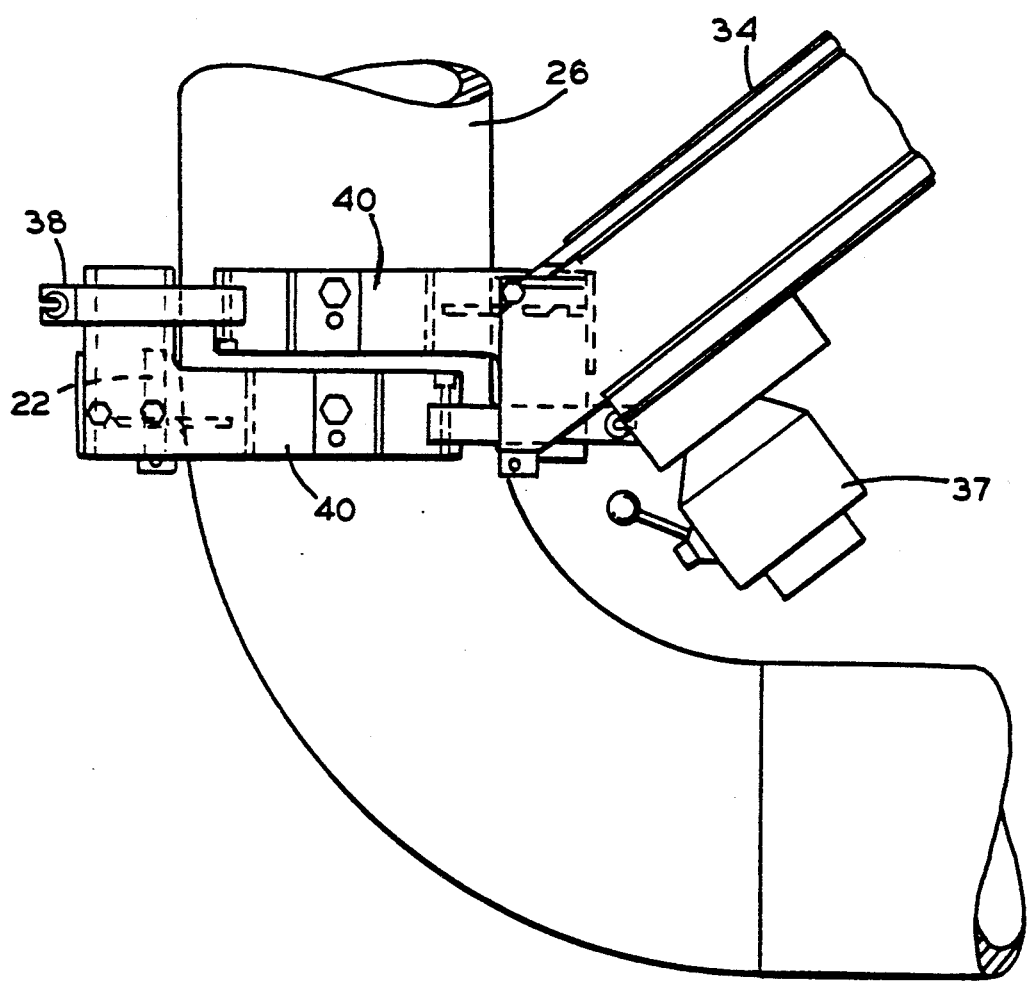
FIG. 7 is a side detailed view illustrating the guide rails of the carriage assembly clamped to the inner track.

Means 18 for vertically positioning tooling attached to assembly 10 is provided in the form of vertical slide 66 attached to second cross slide 52. Vertical slide 66 is operatively engaged with drive motor 68 by means of pulley 70 as seen in the top view of FIG. 4. As seen in FIG. 5 and 6, vertical slide 66 is caused to move along the Z axis(vertically) in response to operation of drive motor 68. FIG. 6 illustrates an alternate embodiment of vertical slide 66 with different tooling 74 than that in FIG. 5.

Means 20 for rotating tooling attached to assembly 10 is provided in the form of a rotary table between vertical slide 66 and second cross slide 52. This allows rotation of vertical slide 66 around its vertical axis.

In operation, inner track 22 is affixed around surge line 26 and outer track 24 is attached either to support skirt 30 or base 32 around the lower periphery of pressurizer 28. The height difference between the tracks is determined by the overall stackup height of assembly 10 and the tooling to be mounted thereon so clearance between the tooling and the heater penetration nozzles 72 is sufficient. Carriage 14, in the form of guide rails 34 and plate 36 slidably mounted therebetween, is rotatably mounted on tracks 22, 24 by means of rollers 44, 46 for rotation around the tracks for access to all of heater penetration nozzles 72 on pressurizer 28. Tooling 74 suitable for the work to be performed such as a milling spindle motor is mounted on vertical slide 66. Tool positioning assembly 10 is then manipulated into position below the heater penetration nozzle 72 in need of repair work to be performed using the six directional movements provided by assembly 10. The first motion is the rotation around the periphery of pressurizer 28 on tracks 22, 24. The second is movement along the X axis(across the width of plate 36 and guide rails 34) using first cross slide 50. The third is movement along the Y axis and radially relative to pressurizer 28) using second cross slide 52. The cross slides, especially second cross slide 52, are used since further movement of carriage 14 would have an effect on the height of the tooling relative to heater penetration nozzle 72. The fourth movement is the inclined adjustment of carriage 14. Vertical slide 66 may be rotated around its own axis for the fifth movement to obtain tooling clearance for easier movement among the maze of heater penetration nozzles 72. Vertical slide 66 is then adjusted vertically for the sixth movement to bring the tooling such as that shown into position at the heater penetration nozzle to be repaired. Although the assembly is described as having the cross slides mounted on the plate of the carriage and the vertical slide mounted on the upper cross slide, it should be understood that these movable parts may be assembled in any order preferred.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A tool positioning assembly for repairing heater penetration nozzles in the lower end of a pressurizer which is supported on the lower end by a support skirt attached between the pressurizer and a base, with a surge line extending vertically from the lower end of the pressurizer, said tool positioning assembly comprising:
   a. an inner track attached around the surge line;
   b. an outer track attached to the support skirt and extending around the periphery of the pressurizer;
   c. a carriage movably mounted on said inner and outer tracks so as to extend between said tracks;
   d. means movably mounted on said carriage for horizontal movement relative to said carriage; and
   e. vertical slide means mounted on said means movably mounted on said carriage for vertical movement relative thereto.

2. The tool positioning assembly of claim 1, further comprising means for rotating said vertical slide means around its own vertical axis.

3. The tool positioning assembly of claim 1, wherein said carriage comprises:
   a. two parallel guide rails; and
   b. a plate movably mounted between said guide rails so as to be movable between said inner and outer tracks.

4. The tool positioning assembly of claim 1, wherein said inner and outer tracks are at different heights.

5. The tool positioning assembly of claim 3, wherein said means movably mounted on said carriage comprises:
   a. a first cross slide for movement across the width of said plate between said parallel guide rails; and
   b. a second cross slide for movement along the length of said plate.

6. A tool positioning assembly for repairing heater penetration nozzles in the lower end of a pressurizer which is supported on the lower end by a support skirt attached between the pressurizer and a base, with a surge line extending vertically from the lower end of the pressurizer, said tool positioning assembly comprising:
   a. an inner track attached around the surge line;
   b. an outer track attached to the base and extending around the periphery of the pressurizer;
   c. a carriage movably mounted on said inner and outer tracks so as to extend between said tracks;
   d. means movably mounted on said carriage for horizontal movement relative to said carriage; and
   e. vertical slide means mounted on said means movably mounted on said carriage for vertical movement relative thereto.

7. The tool positioning assembly of claim 6, further comprising means for rotating said vertical slide means around its own vertical axis.

8. The tool positioning assembly of claim 6, wherein said carriage comprises:
   a. two parallel guide rails; and
   b. a plate movable mounted between said guide rails so as to be movable between said inner and outer tracks.

9. The tool positioning assembly of claim 6, wherein said inner and outer tracks are at different heights.

10. The tool positioning assembly of claim 8, wherein said means movably mounted on said carriage comprises:
    a. a first cross slide for movement across the width of said plate between said parallel guide rails; and
    b. a second cross slide for movement along the length of said plate.

11. A tool positioning assembly for repairing heater penetration nozzles in the lower end of a pressurizer which is supported on the lower end by a support skirt attached between the pressurizer and a base, with a surge line extending vertically from the lower end of the pressurizer, said tool positioning assembly comprising:
    a. an inner track attached around the surge line;
    b. an outer track positioned below and around the outer periphery of the pressurizer;
    c. a pair of parallel guide rails movably received on said inner and outer tracks so as to be movable around said tracks;
    d. a horizontal plate movably mounted between said guide rails so as to be movable between said inner and outer tracks;
    e. means movably mounted on said horizontal plate for horizontal movement relative to said plate; and
    f. vertical slide means movably mounted on said means movably mounted on said horizontal plate for vertical movement relative thereto.

12. The tool positioning assembly of claim 11, wherein said means for horizontal movement comprises:
    a. a first cross slide movably mounted on said horizontal plate for movement across the width of said horizontal plate between said parallel guide rails; and
    b. a second cross slide movably mounted on said first cross slide for movement along the length of said horizontal plate.

13. The tool positioning assembly of claim 11, further comprising means for rotating said vertical slide means around its own vertical axis.

* * * * *